US011994097B2

(12) United States Patent
Koide et al.

(10) Patent No.: US 11,994,097 B2
(45) Date of Patent: May 28, 2024

(54) HYDRAULIC PUMP/MOTOR

(71) Applicant: Komatsu Ltd., Tokyo (JP)

(72) Inventors: Shunsuke Koide, Tokyo (JP); Yuuichirou Tanikawa, Tokyo (JP); Hideaki Usami, Tokyo (JP); Kenta Suzuki, Tokyo (JP)

(73) Assignee: Komatsu Ltd., Tokyo (JP)

( * ) Notice: Subject to any disclaimer, the term of this patent is extended or adjusted under 35 U.S.C. 154(b) by 84 days.

(21) Appl. No.: 17/778,714

(22) PCT Filed: Dec. 4, 2020

(86) PCT No.: PCT/JP2020/045260
§ 371 (c)(1),
(2) Date: May 20, 2022

(87) PCT Pub. No.: WO2021/124930
PCT Pub. Date: Jun. 24, 2021

(65) Prior Publication Data

US 2023/0021713 A1 Jan. 26, 2023

(30) Foreign Application Priority Data

Dec. 19, 2019 (JP) ................................ 2019-229635

(51) Int. Cl.
*F03C 1/06* (2006.01)
*F03C 1/32* (2006.01)
(Continued)

(52) U.S. Cl.
CPC .......... *F03C 1/0655* (2013.01); *F03C 1/0647* (2013.01); *F03C 1/0652* (2013.01);
(Continued)

(58) Field of Classification Search
CPC ...... F04B 1/2042; F04B 11/0091; F04B 1/20; F03C 1/0655
See application file for complete search history.

(56) References Cited

U.S. PATENT DOCUMENTS 8,794,124 B2 8/2014 Iida et al.
9,097,113 B2 8/2015 Miyata et al.
(Continued)

FOREIGN PATENT DOCUMENTS

CN 102812244 A 12/2012
CN 103470465 A 12/2013
(Continued)

*Primary Examiner* — Abiy Teka
(74) *Attorney, Agent, or Firm* — Locke Lord LLP

(57) ABSTRACT

A hydraulic pump/motor includes: a cylinder block rotating about a rotation axis; a piston in a cylinder bore; and a valve plate facing a cylinder port. The valve plate includes: a high pressure port through which oil discharged from the cylinder port flows; a low pressure port through which the oil to be sucked into the cylinder port flows; a region disposed between the high and low pressure ports in a circumferential direction of the rotation axis and including a top dead center position facing the cylinder port of the cylinder bore in which the piston moved to a top dead center is disposed; and a residual pressure release port between the top dead center position and the low pressure port in the region. The residual pressure release port includes first and second ports disposed at positions different from each other in the radial direction of the rotation axis.

14 Claims, 7 Drawing Sheets

(51) Int. Cl.

| | |
|---|---|
| ***F03C 1/34*** | (2006.01) |
| ***F04B 1/2021*** | (2020.01) |
| ***F04B 1/2042*** | (2020.01) |
| ***F04B 53/16*** | (2006.01) |

(52) U.S. Cl.
CPC .......... *F04B 1/2021* (2013.01); *F04B 1/2042* (2013.01); *F04B 53/162* (2013.01)

(56) References Cited

U.S. PATENT DOCUMENTS

| | | | | |
|---|---|---|---|---|
| 10,018,174 | B2 | 7/2018 | Iida et al. | |
| 10,024,158 | B2 | 7/2018 | Hofmann et al. | |
| 10,598,146 | B2 | 3/2020 | Iida et al. | |
| 2013/0068091 | A1 | 3/2013 | Miyata et al. | |
| 2013/0152777 | A1 | 6/2013 | Iida et al. | |
| 2014/0150640 | A1 | 6/2014 | Hofmann et al. | |
| 2016/0327015 | A1 | 11/2016 | Iida et al. | |
| 2017/0045028 | A1* | 2/2017 | Iida | F04B 1/29 |

FOREIGN PATENT DOCUMENTS

| | | | | |
|---|---|---|---|---|
| CN | 105745440 | A | | 7/2016 |
| CN | 106460807 | A | | 2/2017 |
| JP | H08-210242 | A | | 8/1996 |
| JP | H1057850 | A | | 3/1998 |
| JP | 2000-087845 | A | | 3/2000 |
| JP | 2013-253605 | A | | 12/2013 |
| JP | 2014-111914 | A | | 6/2014 |
| JP | 2014111914 | A | * | 6/2014 |
| WO | 2012/026348 | A1 | | 3/2012 |
| WO | 2016/067472 | A1 | | 5/2016 |

* cited by examiner

HYDRAULIC PUMP/MOTOR

FIELD

The present disclosure relates to a hydraulic pump/motor.

BACKGROUND

In a technical field related to hydraulic pumps/motors, there is a known hydraulic pump/motor as disclosed in Patent Literature 1.

CITATION LIST

Patent Literature

Patent Literature 1: WO 2016/067472 A

SUMMARY

Technical Problem

The pressure of the hydraulic oil changes when the hydraulic pump/motor shifts from the discharge process to the suction process. A sudden change in the pressure of the hydraulic oil can cause a cavitation phenomenon in which bubbles are generated in the hydraulic oil. Occurrence of the cavitation phenomenon leads to the possibility of degradation of the performance of the hydraulic pump/motor.

An object of the present disclosure is to suppress a sudden change in the pressure of hydraulic oil when shifting from a discharge process to a suction process.

Solution to Problem

According to an aspect of the present invention, a hydraulic pump/motor comprises: a cylinder block that rotates about a rotation axis; a piston disposed in a cylinder bore of the cylinder block; and a valve plate facing a cylinder port of the cylinder bore, wherein the valve plate includes: a high pressure port through which hydraulic oil discharged from the cylinder port flows; a low pressure port through which hydraulic oil to be sucked into the cylinder port flows; a first region disposed between the high pressure port and the low pressure port in a circumferential direction of the rotation axis, the first region including a top dead center position facing the cylinder port of the cylinder bore in which the piston having moved to a top dead center is disposed; and a residual pressure release port provided between the top dead center position and the low pressure port in the first region, and the residual pressure release port includes a first residual pressure release port and a second residual pressure release port, the second residual pressure release port being disposed at a position different from the first residual pressure release port in a radial direction of the rotation axis.

Advantageous Effects of Invention

According to the present disclosure, a sudden change in the pressure of hydraulic oil is suppressed when shifting from the discharge process to the suction process.

DESCRIPTION OF EMBODIMENTS

Figure 1:
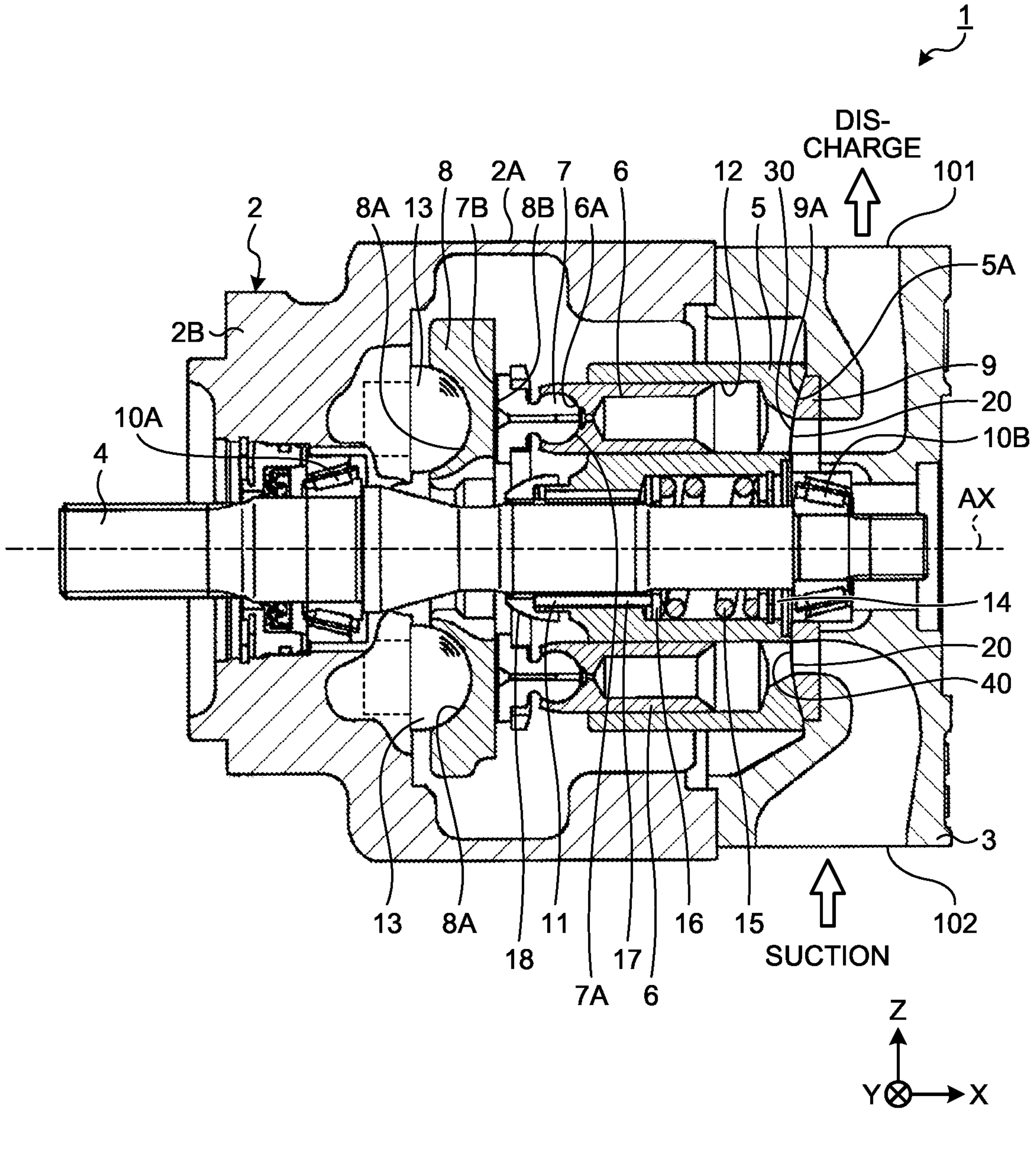
FIG. 1 is a cross-sectional view illustrating a hydraulic pump according to an embodiment.

Hereinafter, embodiments according to the present disclosure will be described with reference to the drawings, but the present disclosure is not limited to the embodiments. The constituents described in the embodiments below can be appropriately combined with each other. In some cases, a portion of the constituents is not utilized.

In an embodiment, an XYZ Cartesian coordinate system is set, and the positional relationship of individual components will be described with reference to the XYZ Cartesian coordinate system. A direction parallel to an X axis of a predetermined plane is defined as an X axis direction, a direction parallel to a Y axis of a predetermined plane orthogonal to the X axis is defined as a Y axis direction, and a direction parallel to a Z axis orthogonal to the X axis and the Y axis is defined as a Z axis direction. A rotational direction or inclination direction about the X axis is defined as a θX direction, a rotational direction or an inclination direction about the Y axis is defined as a θY direction, and a rotational direction or an inclination direction about the Z axis is defined as a θZ direction. In the embodiment, a predetermined plane including the X axis and the Y axis is appropriately referred to as an XY plane, a plane including the Y axis and the Z axis is appropriately referred to as a YZ plane, and a plane including the Z axis and the X axis is appropriately referred to as a ZX plane.

A hydraulic pump 1 is provided in a work machine. The work machine includes: a hydraulic cylinder driven by hydraulic oil discharged from the hydraulic pump 1; and a piece of working equipment that operates with power generated by the hydraulic cylinder. Examples of the work machine include an excavator, a bulldozer, and a wheel loader. The work machine includes an engine. The hydraulic pump 1 includes a shaft 4 and a cylinder block 5 that are each rotated by power of an engine. Each of the shaft 4 and the cylinder block 5 rotates about a rotation axis AX.

In the embodiment, a direction parallel to the rotation axis AX of the shaft 4 and the cylinder block 5 is appropriately referred to as an axial direction, a direction around the rotation axis AX is appropriately referred to as a rotational direction or a circumferential direction, and a radiation direction of the rotation axis AX is appropriately referred to as a radial direction.

In the embodiment, the rotation axis AX extends in the X axis direction. The axial direction and the X axis direction are parallel to each other.

A swash plate 8 and a valve plate 9, which will be described below, are disposed in the X axis direction. The +X direction (+X side) is a direction from the swash plate 8 toward the valve plate 9 (valve plate 9 side). The −X direction (−X side) is a direction from the valve plate 9 toward the swash plate 8 (swash plate 8 side).

As described below, a piston 6 moves to a top dead center and a bottom dead center. In the YZ plane orthogonal to the rotation axis AX, the piston 6 moved to the top dead center and the piston 6 moved to the bottom dead center are located in the Y axis direction. In the YZ plane, the +Y direction (+Y side) is a direction from the top dead center toward the bottom dead center (bottom dead center side). In the YZ plane, the −Y direction (−Y side) is a direction from the bottom dead center toward the top dead center (top dead center side).

As described below, the valve plate 9 includes a high pressure port 30 and a low pressure port 40, each being located in the Z axis direction. The +Z direction (+Z side) is a direction from the low pressure port 40 toward the high pressure port 30 (high pressure port 30 side). The −Z direction (−Z side) is a direction from the high pressure port 30 to the low pressure port 40 (low pressure port 40 side).

In the radial direction, a position close to or a direction approaching the rotation axis AX is appropriately referred to as an inner side in the radial direction, and a position far from or a direction moving away from the rotation axis AX is appropriately referred to as an outer side in the radial direction.

In the circumferential direction, a direction in which the cylinder block 5 rotates is appropriately referred to as a front side in the rotational direction, while a side opposite to the front side in the rotational direction is appropriately referred to as a rear side in the rotational direction.

[Hydraulic Pump]

Figure 2:
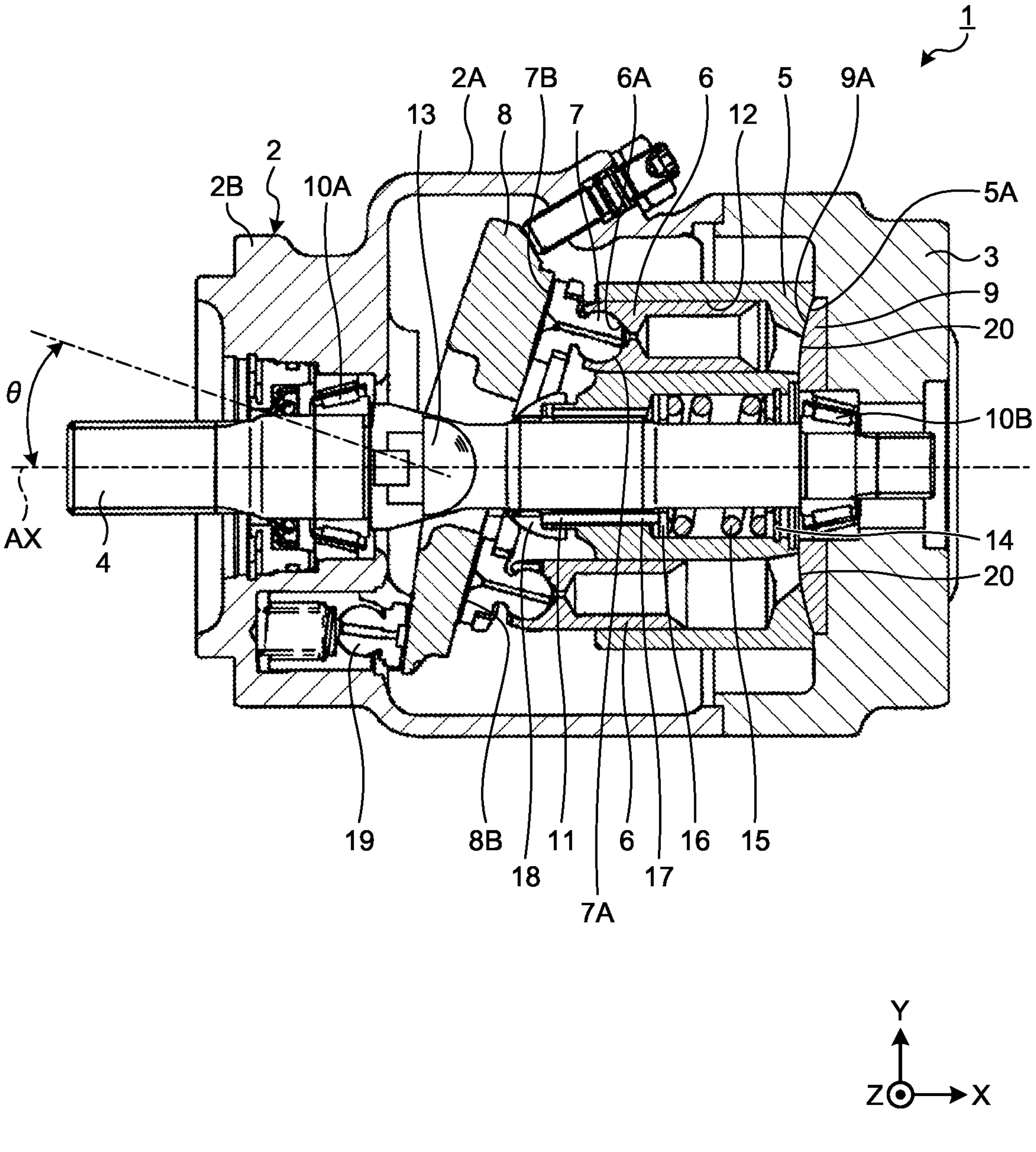
FIG. 2 is a cross-sectional view illustrating the hydraulic pump according to the embodiment.

FIGS. 1 and 2 are cross-sectional views each illustrating the hydraulic pump 1 according to the embodiment. FIG. 1 is a cross-sectional view of the hydraulic pump 1 parallel to the XZ plane. FIG. 2 is a cross-sectional view of the hydraulic pump 1 parallel to the XY plane.

The hydraulic pump 1 includes a case 2, an end cap 3, a shaft 4, a cylinder block 5, a piston 6, a shoe 7, a swash plate 8, and a valve plate 9.

The case 2 includes a cylindrical portion 2A and a base portion 2B connected to an −X side end of the cylindrical portion 2A. The case 2 houses the shaft 4, the cylinder block 5, the piston 6, the shoe 7, and the swash plate 8.

The end cap 3 is connected to the +X side end of the cylindrical portion 2A. The end cap 3 has a discharge port 101 that discharges hydraulic oil and a suction port 102 that sucks hydraulic oil. The shaft 4, the cylinder block 5, the piston 6, the shoe 7, and the swash plate 8 are individually disposed in an internal space of the hydraulic pump 1 defined by the case 2 and the end cap 3.

The shaft 4 is coupled to an engine (not illustrated) of the work machine. The shaft 4 rotates with power generated by the engine of the work machine. The shaft 4 rotates about the rotation axis AX. In the embodiment, the rotation axis AX of the shaft 4 extends in the X axis direction. The −X side end of the shaft 4 is rotatably supported by a bearing 10A. The +X side end of the shaft 4 is rotatably supported by a bearing 10B. The bearing 10A is held by the case 2. The bearing 10B is held by the end cap 3.

The cylinder block 5 is coupled to the shaft 4. The shaft 4 and the cylinder block 5 are coupled to each other via a spline mechanism 11. Together with the shaft 4, the cylinder block 5 rotates about the rotation axis AX.

The cylinder block 5 has a plurality of cylinder bores 12 disposed around the rotation axis AX. The cylinder bore 12 is an internal space of the cylinder block 5 in which the piston 6 is disposed. The cylinder bore 12 extends in the axial direction. A plurality of the cylinder bores 12 is provided at intervals in the circumferential direction of the rotation axis AX. In the embodiment, the plurality of cylinder bores 12 is provided at equal intervals in the circumferential direction of the rotation axis AX. The plurality of cylinder bores 12 is disposed in parallel to each other.

The cylinder bore 12 has a cylinder port 20. The cylinder port 20 is provided at the +X side end of the cylinder bore 12. The cylinder bore 12 is connected to an external space of the cylinder bore 12 via the cylinder port 20. The cylinder port 20 faces the valve plate 9.

The piston 6 is disposed in the cylinder bore 12 of the cylinder block 5. The piston 6 is disposed in each of the plurality of cylinder bores 12. The piston 6 reciprocates in the axial direction while being disposed on the inner side of the cylinder bore 12.

The −X side end of the piston 6 protrudes from the cylinder bore 12 to the −X side. The −X side end of the piston 6 is provided with a recess 6A. The inner surface of the recess 6A is spherical.

The shoe 7 is disposed between the piston 6 and the swash plate 8. The shoe 7 includes: a protrusion 7A disposed in the recess 6A of the piston 6; and a sliding portion 7B coming in contact with the swash plate 8. The outer surface of the protrusion 7A is spherical. The protrusion 7A of the shoe 7 is fitted into the recess 6A of the piston 6. At least a part of the shoe 7 functions as a spherical bearing of the piston 6.

The swash plate 8 is disposed between the base portion 2B of the case 2 and the shoe 7 in the X axis direction. The base portion 2B of the case 2 is provided with a support member 13 that supports the swash plate 8. The swash plate 8 is supported by the support member 13. For example, two support members 13 are provided. The two support members 13 are disposed in the Z axis direction. The rotation axis AX is defined between one support member 13 and the other support member 13. The surface of the support member 13 is spherical. The swash plate 8 has a recess 8A in which the support member 13 is disposed. The inner surface of the recess 8A is spherical. At least a part of the support member 13 functions as a spherical bearing of the swash plate 8.

The swash plate 8 has a sliding surface 8B that slides against the sliding portion 7B of the shoe 7. The sliding surface 8B is a flat surface. The sliding surface 8B faces the sliding portion 7B of the shoe 7. The shoe 7 is pressed against the sliding surface 8B.

A ring 14 is fixed to the inner peripheral surface of the cylinder block 5. The ring 14 is disposed at a +X side end of the inner peripheral surface of the cylinder block 5. Around the shaft 4, a spring 15 is disposed. The +X side end of the spring 15 is supported by the ring 14. Around the shaft 4, also disposed are a movable ring 16, a needle 17, and a pressing member 18. The movable ring 16 is pushed toward the −X side by the spring 15. The pressing member 18 has a ring shape and comes in contact with the needle 17. The shoe 7 is pressed against the sliding surface 8B by the pressing member 18. When the cylinder block 5 rotates and the piston 6 turns around the rotation axis AX, the shoe 7 rotates while being pressed against the sliding surface 8B.

The swash plate 8 can be inclined in the θZ direction. A piston 19 is disposed on the −X side of the swash plate 8. The piston 19 is supported by the case 2. At least a part of the piston 19 comes in contact with the −Y side end of the swash plate 8. With the operation of the piston 19, the swash plate 8 is inclined in the θZ direction. An operation amount of the piston 19 determines an inclination angle θ of the swash plate 8. With the inclination of the swash plate 8, the sliding surface 8B is also inclined.

The movement amount of the piston 6 is controlled based on the inclination angle θ of the swash plate 8. As illustrated in FIG. 2, when the cylinder block 5 rotates about the rotation axis AX in a state where the swash plate 8 is inclined at the inclination angle θ, the shoe 7 turns around the rotation axis AX while being in contact with the sliding surface 8B. By turning around the rotation axis AX while being in contact with the sliding surface 8B, the shoe 7 moves also in the axial direction. When the shoe 7 moves in the axial direction, the piston 6 reciprocates in the axial direction on the inner side of the cylinder bore 12.

The valve plate 9 is disposed so as to face the cylinder port 20 of the cylinder bore 12. The valve plate 9 is disposed on the +X side of the cylinder block 5. The valve plate 9 is supported by the end cap 3. The valve plate 9 does not rotate.

The cylinder block 5 rotates while being in contact with the valve plate 9. The cylinder block 5 has a sliding surface 5A facing the valve plate 9. The valve plate 9 has a sliding surface 9A facing the cylinder block 5. The cylinder block 5 rotates in a state where the sliding surface 5A and the sliding surface 9A are in contact with each other. The sliding surface 9A of the valve plate 9 comes in contact with the sliding surface 5A of the rotating cylinder block 5.

The valve plate 9 includes: a high pressure port 30 through which the hydraulic oil discharged from the cylinder port 20 flows; and a low pressure port 40 through which the hydraulic oil to be sucked into the cylinder port 20 flows. When the piston 6 moves to the +X side (valve plate 9 side), the hydraulic oil in the cylinder bore 12 is discharged from the cylinder port 20 and flows through the high pressure port 30. When the piston 6 moves to the −X side (swash plate 8 side), the hydraulic oil is sucked into the cylinder bore 12 via the low pressure port 40 and the cylinder port 20.

The discharge port 101 is connected to a hydraulic cylinder of a work machine. The suction port 102 is connected to a hydraulic oil tank provided in the work machine. The high pressure port 30 is connected to the discharge port 101. The low pressure port 40 is connected to the suction port 102.

[Operation of Hydraulic Pump]

The piston 6 reciprocates in the axial direction on the inner side of the cylinder bore 12. The movable range of the piston 6 is defined in the axial direction. In the following description, the position on the most +X side (valve plate 9 side) in the movable range of the piston 6 is appropriately referred to as a top dead center, and the position on the most −X side (swash plate 8 side) in the movable range of the piston 6 is appropriately referred to as a bottom dead center.

When the piston 6 moves from the bottom dead center to the top dead center, the hydraulic oil in the cylinder bore 12 is discharged from the cylinder port 20. That is, when the piston 6 moves to the +X side, the hydraulic oil in the cylinder bore 12 is discharged from the cylinder port 20. The hydraulic oil discharged from the cylinder port 20 is supplied to the discharge port 101 via the high pressure port 30 of the valve plate 9. The hydraulic oil supplied to the discharge port 101 is discharged from the discharge port 101 and supplied to the hydraulic cylinder. By adjusting the inclination angle θ of the swash plate 8, the volume of the hydraulic oil discharged from the discharge port 101 is controlled.

When the piston 6 moves from the top dead center to the bottom dead center, the hydraulic oil from the hydraulic oil tank is sucked into the cylinder port 20. That is, when the piston 6 moves to the −X side, the hydraulic oil in the hydraulic oil tank is sucked and supplied to the suction port 102. The hydraulic oil supplied to the suction port 102 is supplied to the cylinder port 20 via the low pressure port 40 of the valve plate 9. The hydraulic oil supplied to the cylinder port 20 is sucked into the cylinder bore 12 via the cylinder port 20.

In this manner, the hydraulic pump 1 converts the rotational force of the shaft 4 into hydraulic pressure, and discharges the hydraulic oil sucked from the suction port 102 from the discharge port 101. The hydraulic pump 1 is a variable displacement hydraulic pump capable of adjusting the volume of the hydraulic oil discharged from the discharge port 101 by changing the inclination angle θ of the swash plate 8.

[Cylinder Block]

Figure 3:
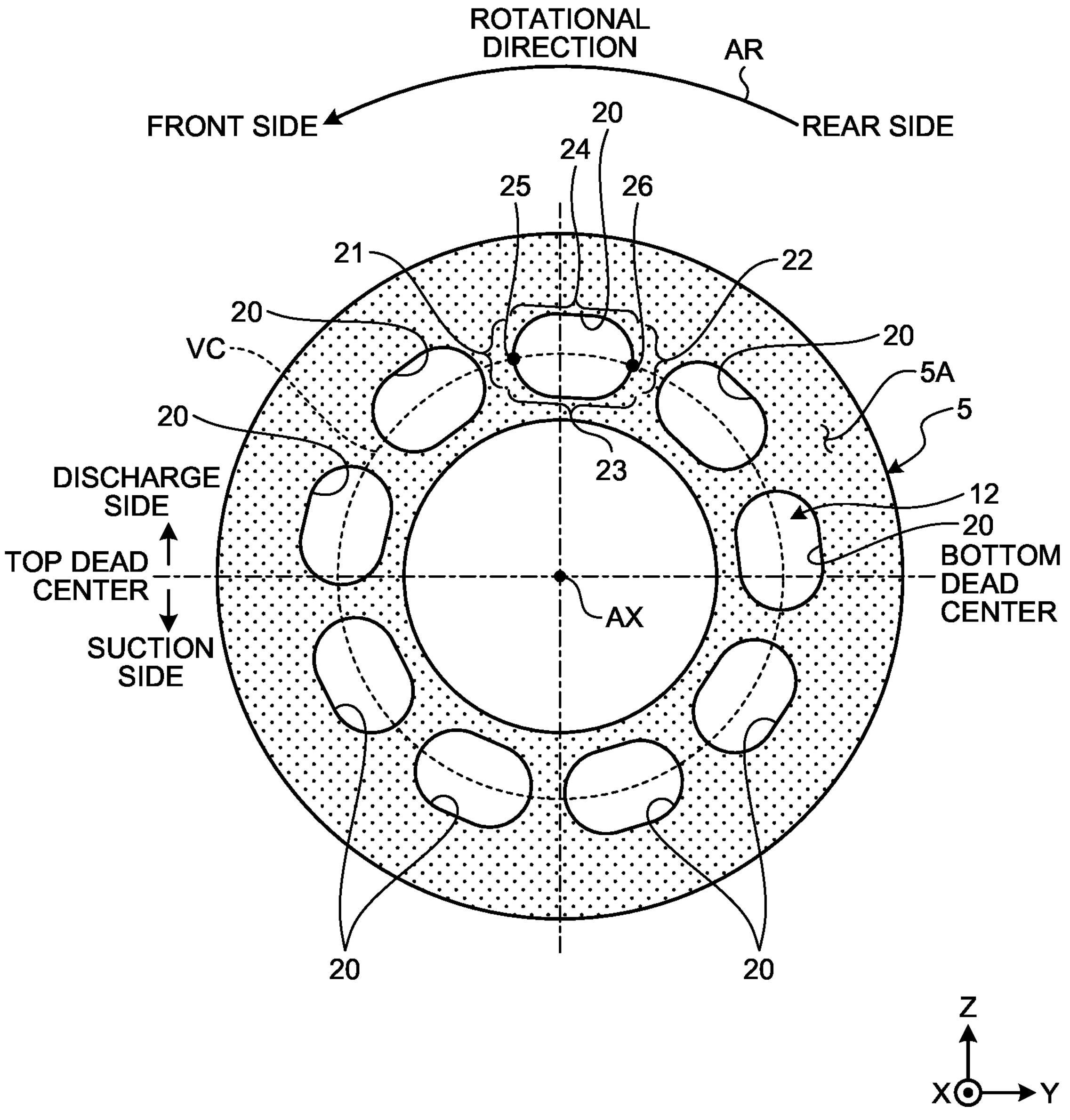
FIG. 3 is a view illustrating a cylinder block according to the embodiment.

FIG. 3 is a diagram illustrating the cylinder block 5 according to the embodiment. As illustrated in FIG. 3, the cylinder block 5 rotates in a direction indicated by an arrow AR. The direction indicated by the arrow AR is the front side in the rotational direction, and the opposite side to the front side in the rotational direction is the rear side in the rotational direction. The front side in the rotational direction indicates one side in the circumferential direction, and the rear side in the rotational direction indicates the other side in the circumferential direction.

As illustrated in FIG. 3, the cylinder block 5 has a plurality of cylinder bores 12 disposed in the circumferential direction of the rotation axis AX. The cylinder port 20 is disposed at the +X side end of the cylinder bore 12. The cylinder port 20 is an opening formed in the sliding surface 5A of the cylinder block 5. The hydraulic oil passes through the cylinder port 20. The plurality of cylinder ports 20 is provided at equal intervals in the circumferential direction of the rotation axis AX. The shapes and dimensions of the plurality of cylinder ports 20 are the same. In the embodiment, the number of cylinder ports 20 is nine.

In the YZ plane, the plurality of cylinder ports 20 is disposed along a virtual circle VC centered on the rotation axis AX. In the radial direction, individual centers of the plurality of cylinder ports 20 are at the same distance from the rotation axis AX. The virtual circle VC passes through the centers of the cylinder ports 20 in the radial direction.

With the rotation of the cylinder block 5, the cylinder port 20 turns around the rotation axis AX.

In the embodiment, the cylinder port 20 has an elongated hole shape extending in the circumferential direction of the rotation axis AX. The edge of the cylinder port 20 includes a front side portion 21 disposed on the front side in the rotational direction, a rear side portion 22 disposed on the rear side in the rotational direction, an inner side portion 23 connecting an inner side end of the front side portion 21 in the radial direction with an inner side end of the rear side portion 22 in the radial direction, and an outer side portion 24 connecting an outer side end of the front side portion 21 in the radial direction with an outer side end of the rear side portion 22 in the radial direction. The cylinder port 20 is provided inside a region surrounded by the front side portion 21, the rear side portion 22, the inner side portion 23, and the outer side portion 24.

The front side portion 21 is a front side edge of the cylinder port 20 in the rotational direction. The front side portion 21 has an arc shape protruding toward the front side in the rotational direction. A front apex 25 indicating the center of the front side portion 21 in the radial direction is disposed on the virtual circle VC. The front apex 25 is a portion disposed on the foremost side of the cylinder port 20 in the rotational direction.

The rear side portion 22 is an edge portion on the rear side of the cylinder port 20 in the rotational direction. The rear side portion 22 has an arc shape protruding toward the rear side in the rotational direction. A rear apex 26 indicating the center of the rear side portion 22 in the radial direction is disposed on the virtual circle VC. The rear apex 26 is a portion disposed on the hindmost side of the cylinder port 20 in the rotational direction.

The inner side portion 23 is an inner side edge of the cylinder port 20 in the radial direction. The inner side portion 23 is disposed on the inner side of the virtual circle VC in the radial direction. The inner side portion 23 has a straight line shape parallel to the tangent of the virtual circle VC between the front apex 25 and the rear apex 26.

The outer side portion 24 is an outer side edge of the cylinder port 20 in the radial direction. The outer side portion 24 is disposed on the outer side of the virtual circle VC in the radial direction. The outer side portion 24 has a straight line shape parallel to the tangent of the virtual circle VC between the front apex 25 and the rear apex 26.

The inner side portion 23 and the outer side portion 24 are parallel to each other. In the radial direction, the distance between the inner side portion 23 and the virtual circle VC is equal to the distance between the outer side portion 24 and the virtual circle VC.

With the rotation of the cylinder block 5 in the direction indicated by the arrow AR, each of the plurality of pistons 6 moves between the top dead center and the bottom dead center. In FIG. 3, the piston 6 disposed on the inner side of the cylinder bore 12 existing on the +Z side of the rotation axis AX moves from the bottom dead center to the top dead center. That is, the hydraulic oil is discharged from the cylinder port 20 existing on the +Z side of the rotation axis AX. The piston 6 disposed on the inner side of the cylinder bore 12 existing on the −Z side of the rotation axis AX moves from the top dead center to the bottom dead center. That is, the hydraulic oil is sucked into the cylinder port 20 existing on the −Z side of the rotation axis AX.

[Valve Plate]

Figure 4:
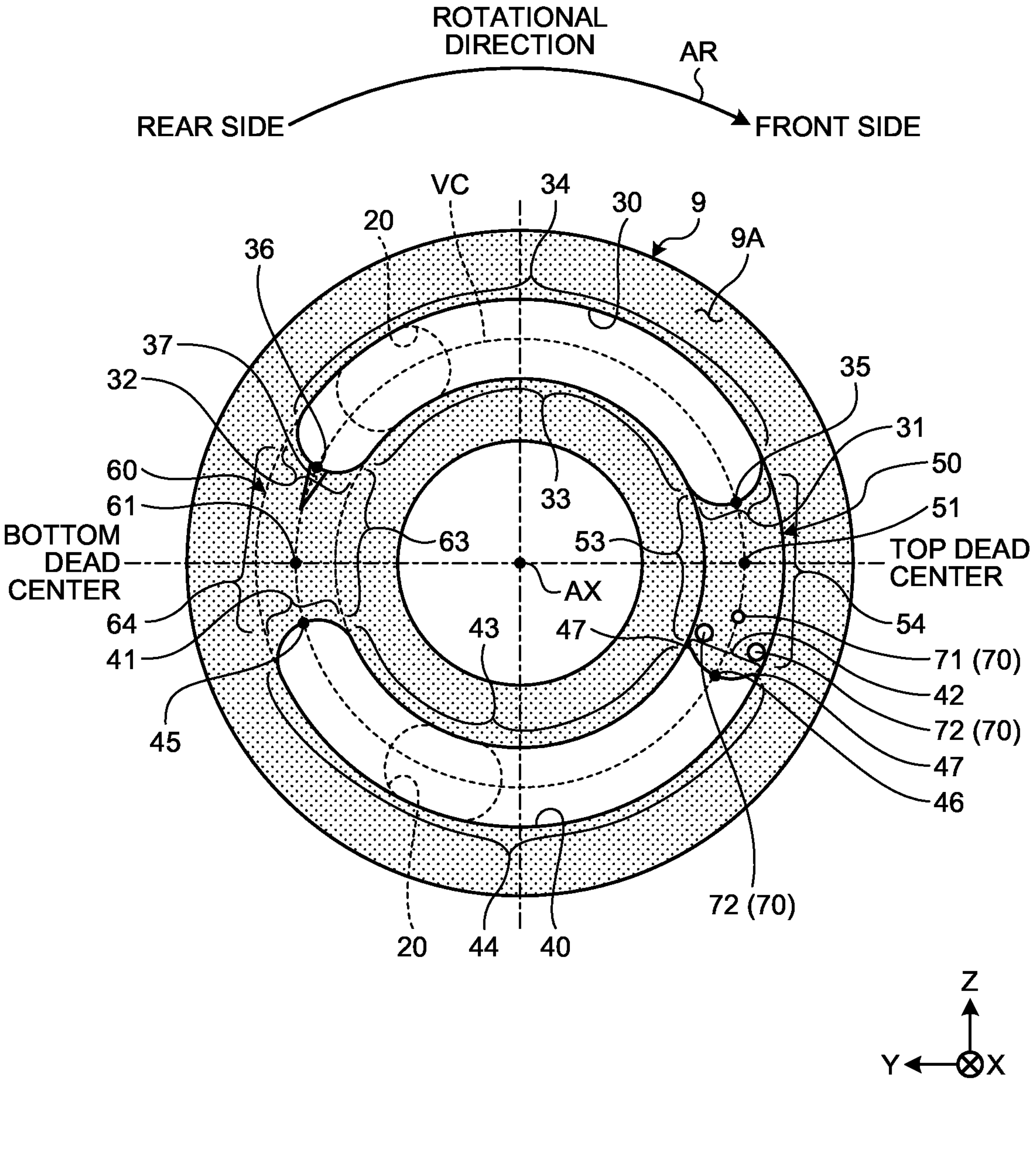
FIG. 4 is a view illustrating a valve plate according to the embodiment.

FIG. 4 is a view illustrating the valve plate 9 according to the embodiment. As illustrated in FIG. 4, the valve plate 9 includes: the high pressure port 30 through which the hydraulic oil discharged from the cylinder port 20 flows; and the low pressure port 40 through which the hydraulic oil to be sucked into the cylinder port 20 flows. In the embodiment, the number of the high pressure port 30 is one. The number of low pressure port 40 is one. The high pressure port 30 is connected to the hydraulic cylinder via the discharge port 101. The low pressure port 40 is connected to the hydraulic oil tank via the suction port 102.

As described above, the valve plate 9 does not rotate. The cylinder block 5 rotates in a direction indicated by an arrow AR in FIG. 4.

In the YZ plane, the high pressure port 30 is disposed along a virtual circle VC centered on the rotation axis AX. The high pressure port 30 is formed in a band shape at a part of the portion around the rotation AX axis so as to face the cylinder ports 20 turning around the rotation axis AX, and the virtual circle VC passes through the center of the high pressure port 30 in the radial direction. In the circumferential direction, the dimension of the high pressure port 30 is larger than the dimension of the cylinder port 20. The high pressure port 30 can face a plurality of cylinder ports 20 simultaneously. In the radial direction, the dimension of the high pressure port 30 is equal to the dimension of the cylinder port 20.

The high pressure port 30 is formed in an arc shape. The high pressure port 30 has an elongated hole shape extending in the circumferential direction of the rotation axis AX. The edge of the high pressure port 30 includes: a front side portion 31 disposed on the front side in the rotational direction; a rear side portion 32 disposed on the rear side in the rotational direction; an inner side portion 33 connecting an inner side end of the front side portion 31 in the radial direction and an inner side end of the rear side portion 32 in the radial direction; and an outer side portion 34 connecting an outer side end of the front side portion 31 in the radial direction and an outer side end of the rear side portion 32 in the radial direction. The high pressure port 30 is provided inside a region surrounded by the front side portion 31, the rear side portion 32, the inner side portion 33, and the outer side portion 34.

The front side portion 31 is a front side edge of the high pressure port 30 in the rotational direction. The front side portion 31 has an arc shape protruding toward the front side in the rotational direction. A front apex 35 indicating the center of the front side portion 31 in the radial direction is disposed on the virtual circle VC. The front apex 35 is a portion disposed on the foremost side of the high pressure port 30 in the rotational direction.

The rear side portion 32 is a rear side edge of the high pressure port 30 in the rotational direction. The rear side portion 32 has an arc shape protruding toward the rear side in the rotational direction. A rear apex 36 indicating the center of the rear side portion 32 in the radial direction is disposed on the virtual circle VC. The rear apex 36 is a portion disposed on the hindmost side of the high pressure port 30 in the rotational direction.

The inner side portion 33 is an inner side edge of the high pressure port 30 in the radial direction. The inner side portion 33 is disposed on the inner side of the virtual circle VC in the radial direction. The inner side portion 33 has an arc shape parallel to the virtual circle VC between the front apex 35 and the rear apex 36.

The outer side portion 34 is an outer side edge of the high pressure port 30 in the radial direction. The outer side portion 34 is disposed on the outer side of the virtual circle VC in the radial direction. The outer side portion 34 has an arc shape parallel to the virtual circle VC between the front apex 35 and the rear apex 36.

The inner side portion 33 and the outer side portion 34 are parallel to each other. In the radial direction, the distance between the inner side portion 33 and the virtual circle VC is equal to the distance between the outer side portion 34 and the virtual circle VC.

In the embodiment, the valve plate 9 has a notch 37 connected to the high pressure port 30. The notch 37 extends from the rear side portion 32 of the high pressure port 30 to the rear side in the rotational direction.

In the YZ plane, the low pressure port 40 is disposed along a virtual circle VC centered on the rotation axis AX. The low pressure port 40 is formed in a band shape at a part of the portion around the rotation AX axis so as to face the cylinder ports 20 turning around the rotation axis AX, and the virtual circle VC passes through the center of the low pressure port 40 in the radial direction. In the circumferential direction, the dimension of the low pressure port 40 is larger than the dimension of the cylinder port 20. The low pressure port 40 can face a plurality of cylinder ports 20 simultaneously. In the radial direction, the low pressure port 40 is equal in dimension to the cylinder port 20.

The low pressure port 40 is formed in an arc shape. The low pressure port 40 has an elongated hole shape extending in the circumferential direction of the rotation axis AX. The edge of the low pressure port 40 includes: a front side portion 41 disposed on the front side in the rotational direction; a rear side portion 42 disposed on the rear side in the rotational direction; an inner side portion 43 connecting an inner side end of the front side portion 41 in the radial direction and an inner side end of the rear side portion 42 in the radial direction; and an outer side portion 44 connecting an outer side end of the front side portion 41 in the radial direction and an outer side end of the rear side portion 42 in the radial direction. The low pressure port 40 is provided inside a region surrounded by the front side portion 41, the rear side portion 42, the inner side portion 43, and the outer side portion 44.

The front side portion 41 is a front side edge of the low pressure port 40 in the rotational direction. The front side portion 41 has an arc shape protruding toward the front side in the rotational direction. A front apex 45 indicating the center of the front side portion 41 in the radial direction is disposed on the virtual circle VC. The front apex 45 is a portion disposed on the foremost side of the low pressure port 40 in the rotational direction.

The rear side portion 42 is a rear side edge of the low pressure port 40 in the rotational direction. The rear side portion 42 has an arc shape protruding toward the front side in the rotational direction. A rear bottom 46 indicating the center of the rear side portion 42 in the radial direction is disposed on the virtual circle VC. A rear apex 47 indicating the end of the rear side portion 42 in the radial direction is disposed on each of the inner side of the virtual circle VC in the radial direction and the outer side of the virtual circle VC in the radial direction. The rear apex 47 is a portion disposed on the hindmost side of the low pressure port 40 in the rotational direction.

The inner side portion 43 is an inner side edge of the low pressure port 40 in the radial direction. The inner side portion 43 is disposed on the inner side of the virtual circle VC in the radial direction. The inner side portion 43 has an arc shape parallel to the virtual circle VC between the front apex 45 and the rear bottom 46.

The outer side portion 44 is an outer side edge of the low pressure port 40 in the radial direction. The outer side portion 44 is disposed on the outer side of the virtual circle VC in the radial direction. The outer side portion 44 has an arc shape parallel to the virtual circle VC between the front apex 45 and the rear bottom 46.

The inner side portion 43 and the outer side portion 44 are parallel to each other. In the radial direction, the distance between the inner side portion 43 and the virtual circle VC is equal to the distance between the outer side portion 44 and the virtual circle VC.

The high pressure port 30 is disposed so as to face the cylinder port 20 of the cylinder bore 12 in which the piston 6 moving from the bottom dead center to the top dead center is disposed. The high pressure port 30 is disposed so as not to face the cylinder port 20 of the cylinder bore 12 in which the piston 6 moved to the bottom dead center is disposed. The high pressure port 30 is disposed so as not to face the cylinder port 20 of the cylinder bore 12 in which the piston 6 moved to the top dead center is disposed.

The low pressure port 40 is disposed so as to face the cylinder port 20 of the cylinder bore 12 in which the piston 6 moving from the top dead center to the bottom dead center is disposed. The low pressure port 40 is disposed so as not to face the cylinder port 20 of the cylinder bore 12 in which the piston 6 moved to the top dead center is disposed. The low pressure port 40 is disposed so as not to face the cylinder port 20 of the cylinder bore 12 in which the piston 6 moved to the bottom dead center is disposed.

The valve plate 9 includes: a first region 50 that is disposed between the high pressure port 30 and the low pressure port 40 in the circumferential direction of the rotation axis AX and includes a top dead center position 51 facing the cylinder port 20 of the cylinder bore 12 in which the piston 6 moved to the top dead center is disposed; and a second region 60 that is disposed between the low pressure port 40 and the high pressure port 30 in the circumferential direction of the rotation axis AX and includes a bottom dead center position 61 facing the cylinder port 20 of the cylinder bore 12 in which the piston 6 moved to the bottom dead center is disposed.

The first region 50 is a part of the sliding surface 9A of the valve plate 9 and is a region between the front side portion 31 of the high pressure port 30 and the rear side portion 42 of the low pressure port 40 in the circumferential direction of the rotation axis AX. The first region 50 is formed in a band shape in a part of the portion around the rotation axis AX so as to face the cylinder ports 20 turning around the rotation axis AX.

The first region 50 includes: an inner side portion 53 connecting the front side end of the inner side portion 33 of the high pressure port 30 in the rotational direction and the rear side end of the inner side portion 43 of the low pressure port 40 in the rotational direction; and an outer side portion 54 connecting the front side end of the outer side portion 34 of the high pressure port 30 in the rotational direction and the rear side end of the outer side portion 44 of the low pressure port 40 in the rotational direction. The first region 50 is a region surrounded by the front side portion 31 of the high pressure port 30, the rear side portion 42 of the low pressure port 40, the inner side portion 53, and the outer side portion 54.

The inner side portion 53 is disposed on the inner side of the virtual circle VC in the radial direction. The inner side portion 53 has an arc shape parallel to the virtual circle VC between the front apex 35 and the rear bottom 46.

The outer side portion 54 is disposed on the outer side of the virtual circle VC in the radial direction. The outer side portion 54 has an arc shape parallel to the virtual circle VC between the front apex 35 and the rear bottom 46.

The inner side portion 53 and the outer side portion 54 are parallel to each other. In the radial direction, the distance between the inner side portion 53 and the virtual circle VC is equal to the distance between the outer side portion 54 and the virtual circle VC.

The top dead center position 51 is a position that faces the center of the cylinder port 20 of the cylinder bore 12 housing the piston 6 disposed at the top dead center. The top dead center position 51 is defined in the first region 50.

The second region 60 is a part of the sliding surface 9A of the valve plate 9 and is a region between the front side portion 41 of the low pressure port 40 and the rear side portion 32 of the high pressure port 30 in the circumferential direction of the rotation axis AX. The second region 60 is formed in a band shape in a part of the portion around the rotation axis AX so as to face the cylinder ports 20 turning around the rotation axis AX.

The second region 60 includes: an inner side portion 63 connecting the front side end of the inner side portion 43 of the low pressure port 40 in the rotational direction and the rear side end of the inner side portion 33 of the high pressure port 30 in the rotational direction; and an outer side portion 64 connecting the front side end of the outer side portion 44 of the low pressure port 40 in the rotational direction and the rear side end of the outer side portion 34 of the high pressure port 30 in the rotational direction. The second region 60 is a region surrounded by the front side portion 41 of the low pressure port 40, the rear side portion 32 of the high pressure port 30, the inner side portion 63, and the outer side portion 64.

The inner side portion 63 is disposed on the inner side of the virtual circle VC in the radial direction. The inner side portion 63 has an arc shape parallel to the virtual circle VC between the front apex 45 and the rear apex 36.

The outer side portion 64 is disposed on the outer side of the virtual circle VC in the radial direction. The outer side portion 64 has an arc shape parallel to the virtual circle VC between the front apex 45 and the rear apex 36.

The inner side portion 63 and the outer side portion 64 are parallel to each other. In the radial direction, the distance between the inner side portion 63 and the virtual circle VC is equal to the distance between the outer side portion 64 and the virtual circle VC.

The bottom dead center position 61 is a position where the center of the cylinder port 20 of the cylinder bore 12 housing the piston 6 disposed at the bottom dead center faces. The bottom dead center position 61 is defined in the second region 60.

The high pressure port 30 is formed so as not to include the top dead center position 51 or the bottom dead center position 61. The high pressure port 30 is not connected to the cylinder port 20 of the cylinder bore 12 that houses the piston 6 disposed at the top dead center. The high pressure port 30 is not connected to the cylinder port 20 of the cylinder bore 12 that houses the piston 6 disposed at the bottom dead center.

The low pressure port 40 is formed so as not to include the top dead center position 51 or the bottom dead center position 61. The low pressure port 40 is not connected to the cylinder port 20 of the cylinder bore 12 that houses the piston 6 disposed at the top dead center. The low pressure port 40 is not connected to the cylinder port 20 of the cylinder bore 12 that houses the piston 6 disposed at the bottom dead center.

As described above, the hydraulic oil is discharged from the cylinder port 20 existing on the +Z side of the rotation axis AX. The high pressure port 30 is disposed on the +Z side of the rotation axis AX so as to face the cylinder port 20 from which the hydraulic oil is discharged.

As described above, the hydraulic oil is sucked into the cylinder port 20 existing on the −Z side of the rotation axis AX. The low pressure port 40 is disposed on the −Z side of the rotation axis AX so as to face the cylinder port 20 that sucks the hydraulic oil.

When the piston 6 turns around the rotation axis AX with the cylinder port 20 facing the first region 50, the piston 6 is switched from a state of discharging the hydraulic oil to a state of sucking the hydraulic oil. That is, the hydraulic oil in the cylinder bore 12 is switched from the high pressure state to the low pressure state when the cylinder port 20 turns around the rotation axis AX in a state of facing the first region 50. The hydraulic pump 1 shifts from the discharge process to the suction process when turning around the rotation axis AX with the cylinder port 20 facing the first region 50.

When the piston 6 turns around the rotation axis AX with the cylinder port 20 facing the second region 60, the piston 6 is switched from a state of sucking the hydraulic oil to a state of discharging the hydraulic oil. That is, the hydraulic oil in the cylinder bore 12 is switched from the low pressure state to the high pressure state when the cylinder port 20 turns around the rotation axis AX in a state of facing the second region 60. The hydraulic pump 1 shifts from the suction process to the discharge process when the cylinder port 20 turns around the rotation axis AX in a state of facing the second region 60.

[Residual Pressure Release Port]

Figure 5:
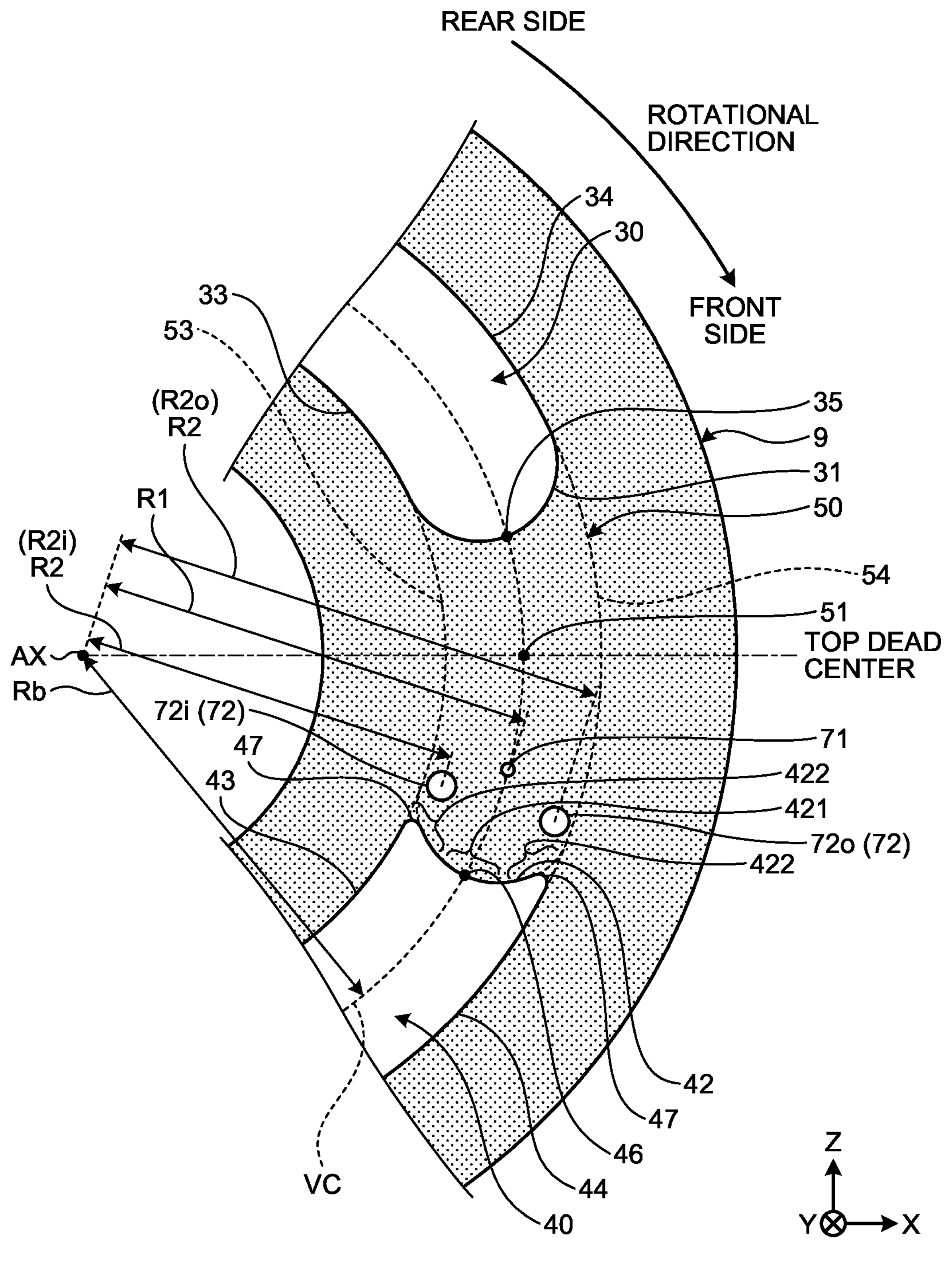
FIG. 5 is an enlarged view illustrating a part of the valve plate according to the embodiment.

FIG. 5 is an enlarged view illustrating a part of the valve plate 9 according to the embodiment. FIG. 5 is an enlarged view illustrating the vicinity of the first region 50 in FIG. 4.

As illustrated in FIGS. 4 and 5, the valve plate 9 has a residual pressure release port 70 provided between the top dead center position 51 and the low pressure port 40 in the first region 50. The residual pressure release port 70 is provided between the top dead center position 51 and the rear side portion 42 of the low pressure port 40 in the circumferential direction of the rotation axis AX. The residual pressure release port 70 is connected to the hydraulic oil tank. The residual pressure release port 70 penetrates the valve plate 9. At least a part of the hydraulic oil existing between the cylinder bore 12 of the cylinder block 5 and the first region 50 of the valve plate 9 is discharged from the residual pressure release port 70.

In the embodiment, the residual pressure release port 70 includes a first residual pressure release port 71 and a second residual pressure release port 72 disposed at a position different from the first residual pressure release port 71 in the radial direction of the rotation axis AX.

As described above, the hydraulic pump 1 shifts from the discharge process to the suction process when the cylinder port 20 turns around the rotation axis AX in a state of facing the first region 50. The pressure of the hydraulic oil changes when the hydraulic pump 1 shifts from the discharge process to the suction process. A sudden change in the pressure of the hydraulic oil can cause a cavitation phenomenon in which bubbles are generated in the hydraulic oil. An occurrence of the cavitation phenomenon leads to the possibility of an occurrence of abnormal noise, worsened efficiency, or further deterioration of the hydraulic pump 1. That is, an occurrence of the cavitation phenomenon leads to degradation of performance of the hydraulic pump 1.

The residual pressure release port 70 suppresses a sudden change in the pressure of the hydraulic oil when the hydraulic pump 1 shifts from the discharge process to the suction process. With no residual pressure release port 70 provided in the first region 50, the pressure of the hydraulic oil in the cylinder bore 12 would suddenly decrease when the cylinder port 20 shifts from a state facing the first region 50 to a state facing the low pressure port 40. The sudden decrease in the pressure of the hydraulic oil leads to an occurrence of a cavitation phenomenon.

The residual pressure release port 70 is provided on the front side of the top dead center position 51 in the rotational direction. Immediately after the shift from the discharge process to the suction process, at least a part of the hydraulic oil existing between the cylinder bore 12 of the cylinder block 5 and the first region 50 of the valve plate 9 is discharged from the residual pressure release port 70. That is, in a state where the cylinder port 20 faces the first region 50, the pressure of the hydraulic oil in the cylinder bore 12 decreases by a predetermined amount. After the pressure of the hydraulic oil in the cylinder bore 12 decreases by the predetermined amount, the cylinder port 20 shifts to the state facing the low pressure port 40. Since the cylinder port 20 shifts to the state facing the low pressure port 40 after the pressure of the hydraulic oil in the cylinder bore 12 decreases by a predetermined amount, a sudden change in the pressure of the hydraulic oil is suppressed when the hydraulic pump 1 shifts from the discharge process to the suction process. This leads to suppression of an occurrence of the cavitation phenomenon.

The first residual pressure release port 71 has a circular shape, for example. The second residual pressure release port 72 has a circular shape, for example. The size of the first residual pressure release port 71 is smaller than the size of the second residual pressure release port 72, for example.

In the radial direction, the position of the first residual pressure release port 71 is different from the position of the second residual pressure release port 72. In the radial direction, the first residual pressure release port 71 is provided at a position closer to the center of the first region 50, compared with the second residual pressure release port 72. The center of the first region 50 in the radial direction is a center between the inner side portion 53 and the outer side portion 54 in the radial direction. In the embodiment, the virtual circle VC passes through the center of the first region 50 in the radial direction.

That is, in the radial direction, when the distance between the rotation axis AX and the center of the low pressure port 40 is Rb, the distance between the rotation axis AX and the center of the first residual pressure release port 71 is R1, and the distance between the rotation axis AX and the center of the second residual pressure release port 72 is R2, the first residual pressure release port 71 and the second residual pressure release port 72 are each provided so as to satisfy the following condition of Formula (1).

$$|Rb-R1|<|Rb-R2| \quad (1)$$

In the embodiment, the distance Rb between the rotation axis AX and the center of the low pressure port 40 in the radial direction is equal to the distance between the rotation axis AX and the center of the first region 50 in the radial direction. The center of the low pressure port 40 in the radial direction is a center between the inner side portion 43 and the outer side portion 44 in the radial direction. In the embodiment, the virtual circle VC passes through the center of the low pressure port 40 in the radial direction.

In the embodiment, the first residual pressure release port 71 is disposed at the center of the first region 50 in the radial direction. That is, in the embodiment, the first residual pressure release port 71 is provided so as to satisfy the condition of the following Formula (2).

$$Rb=R1 \quad (2)$$

Note that the first residual pressure release port 71 may be disposed at a position shifted from the center of the first region 50 in the radial direction.

The second residual pressure release port 72 is disposed at each position of an inner side and an outer side of the first residual pressure release port 71 in the radial direction. In the embodiment, the second residual pressure release port 72 is disposed one each at the inner side and at the outer side of the first residual pressure release port 71 in the radial direction.

In the following description, the second residual pressure release port 72 disposed on the inner side of the first residual pressure release port 71 in the radial direction is appropriately referred to as a second residual pressure release port 72*i,* and the second residual pressure release port 72 disposed on the outer side of the first residual pressure release port 71 in the radial direction is appropriately referred to as a second residual pressure release port 72*o.*

In the radial direction, a distance between the first residual pressure release port 71 and the second residual pressure release port 72*i* is equal to a distance between the first residual pressure release port 71 and the second residual pressure release port 72*o.*

That is, in the radial direction, when a distance between the rotation axis AX and the center of the second residual pressure release port 72*i* on the inner side in the radial direction is R2*i,* and a distance between the rotation axis AX and the center of the second residual pressure release port 72*o* on the outer side in the radial direction is R2*o,* the first residual pressure release port 71, the second residual pressure release port 72*i,* and the second residual pressure release port 72*o* are disposed so as to satisfy the following condition of Formula (3).

$$|R1-R2i|=|R1-R2o| \quad (3)$$

In the embodiment, the rear side portion 42, which is a rear side edge of the low pressure port 40 in the rotational direction, has an arc shape protruding toward the front side in the rotational direction. The rear side portion 42 includes a first portion 421 and a second portion 422 protruding toward the rear side in the rotational direction compared with the first portion 421. The first portion 421 includes a rear bottom 46. The second portion 422 includes a rear apex 47. The second portion 422 is disposed at each position of the inner side and outer side of the first portion 421 in the radial direction.

The second residual pressure release port 72 is provided such that a distance between the rotation axis AX and at least a part of the second portion 422 matches a distance between the rotation axis AX and the second residual pressure release port 72 in the radial direction. The second residual pressure release port 72 is disposed in the vicinity of the second portion 422.

In the radial direction, a distance between the rotation axis AX and the second residual pressure release port 72*i* matches a distance between the rotation axis AX and at least a part of the second portion 421 disposed on the inner side of the first portion 422 in the radial direction. In the radial direction, the distance between the rotation axis AX and the second residual pressure release port 72*o* matches the distance between the rotation axis AX and at least a part of the rear apex 47 disposed on the outside the rear bottom 46 in the radial direction.

In addition, the first residual pressure release port 71 is provided such that a distance between the rotation axis AX and at least a part of the first portion 421 matches a distance between the rotation axis AX and the first residual pressure release port 71 in the radial direction. In the embodiment, the distance between the rotation axis AX and the rear bottom 46 matches the distance between the rotation axis AX and the center of the first residual pressure release port 71 in the radial direction.

In the circumferential direction, a distance between the top dead center position 51 and the first residual pressure release port 71 is shorter than a distance between the top dead center position 51 and the second residual pressure release port 72. That is, the first residual pressure release port 71 is disposed on the rear side of the second residual pressure release port 72 in the rotational direction.

[Operations of Cylinder Block and Valve Plate]

Figure 6:
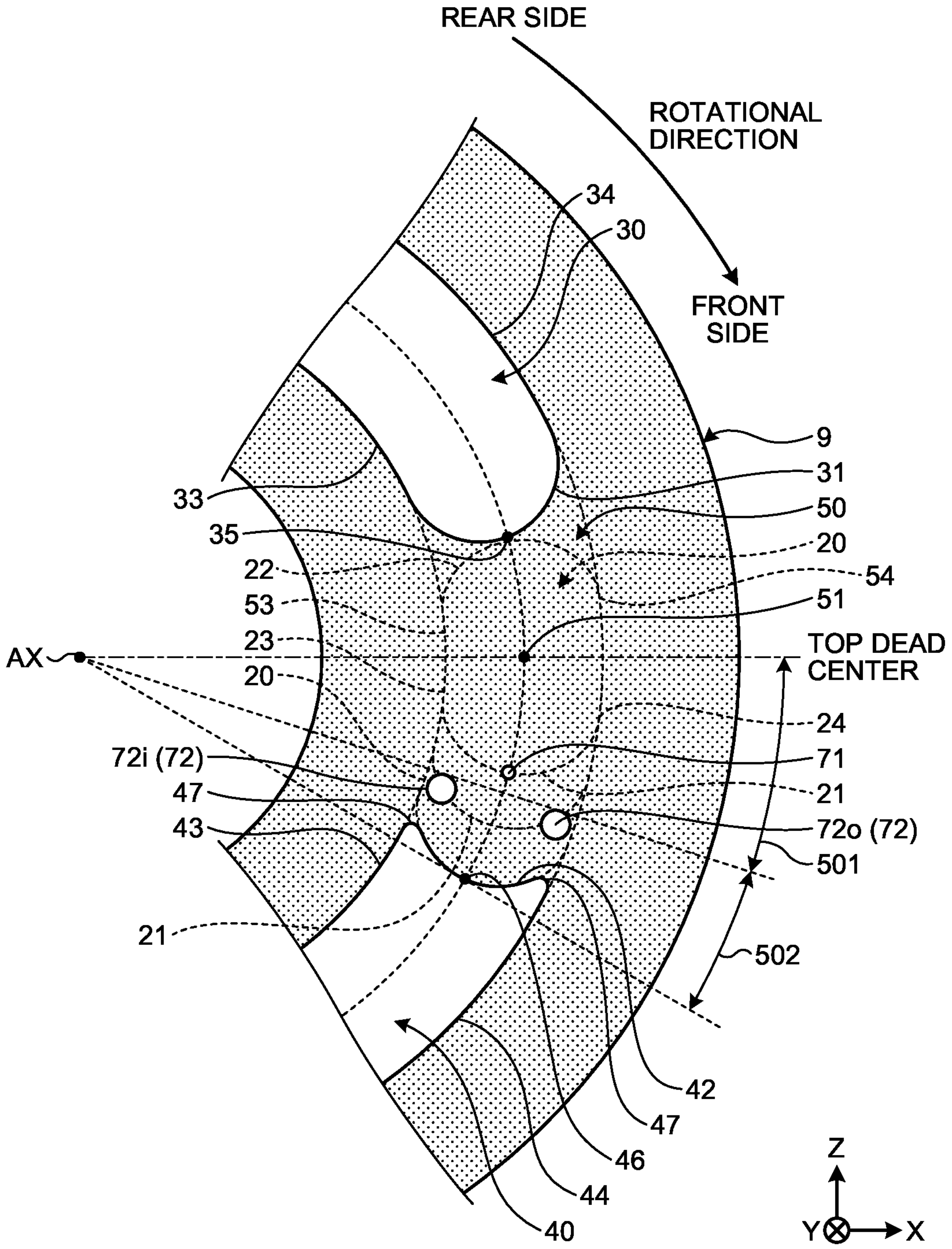
FIG. 6 is a view for describing operations of the cylinder block and the valve plate according to the embodiment.

FIG. 6 is a view for describing operations of the cylinder block 5 and the valve plate 9 according to the embodiment. As illustrated in FIG. 6, when the hydraulic pump 1 shifts from the discharge process to the suction process, the cylinder port 20 turns around the rotation axis AX in a state of facing the first region 50.

As illustrated in FIG. 6, the dimension of the high pressure port 30, the dimension of the first region 50, the dimension of the low pressure port 40, and the dimension of the cylinder port 20 are the same in the radial direction.

The dimension of the high pressure port 30 in the radial direction refers to a distance between the inner side portion 33 and the outer side portion 34 in the radial direction. The dimension of the first region 50 in the radial direction refers to a distance between the inner side portion 53 and the outer side portion 54 in the radial direction. The dimension of the low pressure port 40 in the radial direction refers to a distance between the inner side portion 43 and the outer side portion 44 in the radial direction. The dimension of the cylinder port 20 in the radial direction refers to a distance between the inner side portion 23 and the outer side portion 24 in the radial direction.

In the radial direction, the position of at least a part of the inner side portion 33 matches the position of the inner side portion 23. In the radial direction, the position of at least a part of the outer side portion 34 matches the position of the outer side portion 24.

In the radial direction, the position of at least a part of the inner side portion 53 matches the position of the inner side portion 23. In the radial direction, the position of at least a part of the outer side portion 54 matches the position of the outer side portion 24.

In the radial direction, the position of at least a part of the inner side portion 43 matches the position of the inner side portion 23. In the radial direction, the position of at least a part of the outer side portion 44 matches the position of the outer side portion 24.

As illustrated in FIG. 6, in the embodiment, when the cylinder block 5 rotates with the cylinder port 20 facing the first region 50, the cylinder port 20 faces the second residual pressure release port 72 after facing the first residual pressure release port 71, and faces the low pressure port 40 after facing the second residual pressure release port 72. That is, the cylinder block 5 rotates through the cylinder port 20 such that the cylinder bore 12 is connected to the first residual pressure release port 71, then connected to the second residual pressure release port 72, and connected to the low pressure port 40 after being connected to the second residual pressure release port 72.

The first region 50 includes: an assist region 501 in which rotation assist force of the cylinder block 5 is generated based on the hydraulic oil in the cylinder bore 12; and a residual pressure release region 502 in which the pressure of the hydraulic oil in the cylinder bore 12 decreases due to the connection between the second residual pressure release port 72 and the cylinder bore 12.

As illustrated in FIG. 6, the assist region 501 is a region between the top dead center position 51 and the second residual pressure release port 72 in the circumferential direction. The first residual pressure release port 71 is provided in the assist region 501. The second residual pressure release port 72 is not provided in the assist region 501.

The assist region 501 is a planar region having no second residual pressure release port 72. In a state where the cylinder port 20 of the cylinder bore 12 faces the assist region 501, the piston 6 starts to move from the top dead center to the bottom dead center, although the pressure of the hydraulic oil in the cylinder bore 12 is sufficiently high. The high pressure hydraulic oil between the cylinder bore 12 and the assist region 501 assists the rotation of the cylinder block 5. The high pressure of the hydraulic oil in the cylinder bore 12 is converted into the rotation assist force of the cylinder block 5, leading to improvement of the efficiency of the hydraulic pump 1.

In the embodiment, the first residual pressure release port 71 is disposed in the assist region 501. In a state where the cylinder port 20 faces the assist region 501, at least a part of the hydraulic oil in the cylinder bore 12 is discharged from the first residual pressure release port 71. By discharging at least a part of the hydraulic oil in the cylinder bore 12 from the first residual pressure release port 71, the pressure of the hydraulic oil decreases by a first predetermined amount.

The size of the first residual pressure release port 71 is smaller than the size of the second residual pressure release port 72. In a state where the cylinder port 20 faces the assist region 501, the amount of the hydraulic oil discharged from the first residual pressure release port 71 is a first amount which is very small, and the first predetermined amount that is a decrease amount of the pressure of the hydraulic oil in the cylinder bore 12 is small. That is, although the pressure of the hydraulic oil in the cylinder bore 12 slightly decreases, the high pressure of the hydraulic oil in the cylinder bore 12 is maintained. This achieves acquisition of the rotation assist force of the cylinder block 5.

As illustrated in FIG. 6, the residual pressure release region 502 is a region between the assist region 501 and the low pressure port 40 in the circumferential direction. The second residual pressure release port 72 is provided in the residual pressure release region 502.

The residual pressure release region 502 is a region having the second residual pressure release port 72. In a state where the cylinder port 20 of the cylinder bore 12 faces the residual pressure release region 502, at least a part of the hydraulic oil in the cylinder bore 12 is discharged from the second residual pressure release port 72. By discharging at least a part of the hydraulic oil in the cylinder bore 12 from the second residual pressure release port 72, the pressure of the hydraulic oil decreases by a second predetermined amount.

The size of the second residual pressure release port 72 is larger than the size of the first residual pressure release port 71. In a state where the cylinder port 20 faces the residual pressure release region 502, the amount of the hydraulic oil from the second residual pressure release port 72 is a second amount larger than the first amount, and the second predetermined amount that is a decrease amount of the pressure of the hydraulic oil in the cylinder bore 12 is larger than the first predetermined amount.

A plurality of the second residual pressure release ports 72 is provided in the radial direction. In the embodiment, the residual pressure release region 502 is provided with a second residual pressure release port 72*i* and a second residual pressure release port 72*o*. As illustrated in FIG. 6, when the cylinder block 5 rotates, the cylinder port 20 is simultaneously connected to the plurality of second residual pressure release ports 72. In the embodiment, as illustrated in FIG. 6, when the cylinder block 5 rotates, the front side portion 21 of the cylinder port 20 is simultaneously connected to the second residual pressure release port 72*i* and the second residual pressure release port 72*o*. The hydraulic oil in the cylinder bore 12 is sufficiently discharged from the plurality of second residual pressure release ports 72*o*.

The cylinder port 20 shifts to a state facing the low pressure port 40 after being shifted from a state facing the assist region 501 to a state facing the residual pressure release region 502. As described above, in a state where the cylinder port 20 faces the assist region 501, the hydraulic oil is discharged from the first residual pressure release port 71, leading to the decrease in the pressure of the hydraulic oil in the cylinder bore 12 by the first predetermined amount. In a state where the cylinder port 20 faces the residual pressure release region 502, the hydraulic oil is discharged from the second residual pressure release port 72, leading to the decrease in the pressure of the hydraulic oil in the cylinder bore 12 by the second predetermined amount larger than the first predetermined amount. That is, in the embodiment, in a state where the cylinder port 20 faces the first region 50, the pressure of the hydraulic oil in the cylinder bore 12 decreases in two steps. After the pressure of the hydraulic oil in the cylinder bore 12 decreases in two steps, the cylinder port 20 faces the low pressure port 40. This suppresses a sudden change in the pressure of the hydraulic oil when the hydraulic pump 1 shifts from the discharge process to the suction process. This leads to suppression of an occurrence of the cavitation phenomenon.

As described above, the front side portion 21, which is the front side edge of the cylinder port 20 in the rotational direction, has an arc shape protruding toward the front side in the rotational direction. The rear side portion 42 which is the rear side edge of the low pressure port 40 in the rotational direction has an arc shape protruding toward the front side in the rotational direction. In the embodiment, the shape of the front side portion 21 of the cylinder port 20 matches the shape of the rear side portion 42 of the low pressure port 40. Therefore, when the cylinder port 20 shifts from the state of facing the residual pressure release region 502 to the state of facing the low pressure port 40, the front side portion 21 and the rear side portion 42 overlap each other.

As illustrated in FIG. 4, the notch 37 is provided in the rear side portion 32 of the high pressure port 30. The notch 37 functions as a self-pressure throttle before the cylinder bore 12 is connected to the high pressure port 30. Due to the presence of the notch 37, the pressure of the hydraulic oil in the cylinder bore 12 gradually approaches the pressure of the hydraulic oil in the high pressure port 30 immediately before the cylinder bore 12 and the high pressure port 30 are connected to each other. This suppresses the generation of abnormal noise when the cylinder bore 12 and the high pressure port 30 are connected to each other. Note that the notch 37 may be omitted.

[Performance Test Results]

A performance test was performed on each of the hydraulic pump according to a comparative example and the hydraulic pump 1 according to an implemented example. The performance test that was conducted includes a measurement of cavitation risk and a measurement of rotation assist force. The measurement of the cavitation risk includes a measurement of a negative pressure region in the hydraulic oil in the cylinder bore when the cylinder port faces the first region of the valve plate.

The hydraulic pump according to the comparative example is a hydraulic pump provided with one residual pressure release port as disclosed in WO 2016/067472 A. The hydraulic pump 1 according to the implemented example is the hydraulic pump 1 having the first residual pressure release port 71 and the two second residual pressure release ports 72 as described in the above-described embodiment.

Figure 7:
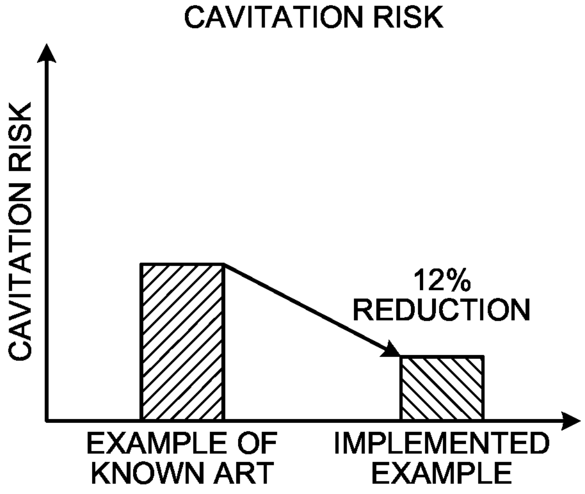
FIG. 7 is a diagram illustrating a performance test result of a hydraulic pump.
Figure 8:
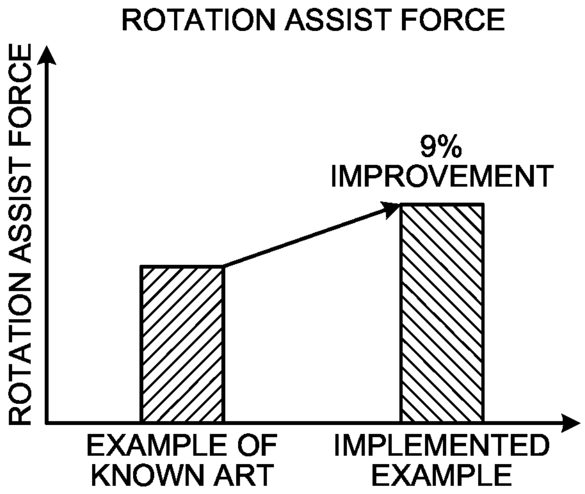
FIG. 8 is a diagram illustrating a performance test result of a hydraulic pump.

FIGS. 7 and 8 are diagrams each illustrating a performance test result of the hydraulic pump.

FIG. 7 is a diagram illustrating a cavitation risk of the hydraulic pump according to the comparative example and the hydraulic pump 1 according to the implemented example. The state having a lower cavitation risk is considered to be the state having higher effectiveness of suppressing the occurrence of the cavitation phenomenon and thus higher hydraulic pump performance. As illustrated in FIG. 7, it has been confirmed that the cavitation risk of the hydraulic pump 1 according to the implemented example has been reduced by 12 [%] as compared with the cavitation risk of the hydraulic pump according to the comparative example.

FIG. 8 is a diagram illustrating a rotation assist force of the hydraulic pump according to the comparative example and the hydraulic pump 1 according to the implemented example. The state having a higher rotation assist force is considered to be the state having higher efficiency in the hydraulic pump and thus higher hydraulic pump performance. As illustrated in FIG. 8, it has been confirmed that the rotation assist force of the hydraulic pump 1 according to the implemented example is improved by 9 [%] as compared with the rotation assist force of the hydraulic pump according to the comparative example.

[Effects]

As described above, according to the embodiment, the first region 50 is disposed between the high pressure port 30 and the low pressure port 40 of the valve plate 9 in the circumferential direction. The first region 50 has the top dead center position 51. The residual pressure release port 70 is provided between the top dead center position 51 and the low pressure port 40 in the circumferential direction of the first region 50. The residual pressure release port 70 includes the first residual pressure release port 71 and the second residual pressure release port 72 disposed at mutually different positions in the radial direction. By disposing at least two residual pressure release ports 70 in the radial direction, the pressure of the hydraulic oil in the cylinder bore 12 is reduced by a predetermined amount in a state where the cylinder port 20 faces the first region 50. Since the cylinder port 20 of the cylinder bore 12 faces the low pressure port 40 after the pressure of the hydraulic oil in the cylinder bore 12 is reduced by the predetermined amount, it is possible to suppress a sudden change in the pressure of the hydraulic oil when the hydraulic pump 1 shifts from the discharge process to the suction process. This leads to suppression of the occurrence of the cavitation phenomenon.

The first residual pressure release port 71 and the second residual pressure release port 72 are disposed to satisfy the condition of Formula (1). That is, the first residual pressure release port 71 is disposed at the central portion of the first region 50 in the radial direction, and the second residual pressure release port 72 is disposed at the end of the first region 50 in the radial direction. This configuration can appropriately reduce the pressure of the hydraulic oil in the cylinder bore 12 in a state where the cylinder port 20 faces the first region 50.

The first residual pressure release port 71 is disposed so as to satisfy the condition of Formula (2). That is, the first residual pressure release port 71 is disposed at the center of the first region 50 in the radial direction. This configuration can appropriately reduce the pressure of the hydraulic oil in the cylinder bore 12 in a state where the cylinder port 20 faces the first region 50.

The second residual pressure release port 72 includes: the second residual pressure release port 72*i* disposed on the inner side of the first residual pressure release port 71 in the radial direction; and the second residual pressure release port 72*o* disposed on the outer side of the first residual pressure release port 71 in the radial direction. By discharging the hydraulic oil individually from the first residual pressure release port 71, the second residual pressure release port 72*i*, and the second residual pressure release port 72*o*, the pressure of the hydraulic oil in the cylinder bore 12 is appropriately reduced in a state where the cylinder port 20 faces the first region 50.

The first residual pressure release port 71, the second residual pressure release port 72*i*, and the second residual pressure release port 72*o* satisfy the condition of Formula (3). This configuration can appropriately reduce the pressure of the hydraulic oil in the cylinder bore 12 in a state where the cylinder port 20 faces the first region 50.

In the circumferential direction, a distance between the top dead center position 51 and the first residual pressure release port 71 is shorter than a distance between the top dead center position 51 and the second residual pressure release port 72. That is, the first residual pressure release port 71 is disposed on the rear side of the second residual pressure release port 72 in the rotational direction. This configuration can reduce the pressure of the hydraulic oil in the cylinder bore 12 stepwise in a state where the cylinder port 20 faces the first region 50. This leads to effective suppression of the occurrence of the cavitation phenomenon.

The size of the first residual pressure release port 71 is smaller than the size of the second residual pressure release port 72. Therefore, the pressure of the hydraulic oil in the cylinder bore 12 decreases by the first predetermined amount and thereafter decreases by the second predetermined amount larger than the first predetermined amount. Since the cylinder port 20 faces the low pressure port 40 after the pressure of the hydraulic oil in the cylinder bore 12 decreases by the first predetermined amount and the second predetermined amount, the pressure of the hydraulic oil in the cylinder bore 12 is appropriately reduced. This leads to effective suppression of the occurrence of the cavitation phenomenon.

The first region 50 includes: the assist region 501 which is disposed between the top dead center position 51 and the second residual pressure release port 72 and in which a rotation assist force of the cylinder block 5 is generated based on the hydraulic oil in the cylinder bore 12; and the residual pressure release region 502 which is disposed between the assist region 501 and the low pressure port 40 and in which the pressure of the hydraulic oil in the cylinder bore 12 decreases due to the connection between the second residual pressure release port 72 and the cylinder bore 12. The first residual pressure release port 71 is provided in the assist region 501. The second residual pressure release port 72 is provided in the residual pressure release region 502. Due to the presence of the assist region 501, the rotation assist force is applied to the cylinder block 5, improving the efficiency of the hydraulic pump 1. In addition, the assist region 501 is provided with the first residual pressure release port 71 smaller than the second residual pressure release port 72. This makes it possible to reduce the pressure of the hydraulic oil while generating the rotation assist force. The presence of the residual pressure release region 502 makes it possible to sufficiently reduce the pressure of the hydraulic oil. This can suppress a sudden decrease in the pressure of the hydraulic oil when the cylinder port 20 faces the low pressure port 40. This leads to effective suppression of the occurrence of the cavitation phenomenon.

The cylinder block 5 rotates such that that the cylinder bore 12 is connected to the second residual pressure release port 71 after being connected to the first residual pressure release port 72, and is connected to the low pressure port 40 after being connected to the second residual pressure release port 72. With this configuration, the pressure of the hydraulic oil in the cylinder bore 12 is reduced in two steps, and thereafter, the cylinder bore 12 is connected to the low pressure port 40. This can suppress a sudden decrease in the pressure of the hydraulic oil when the cylinder port 20 faces the low pressure port 40. This leads to effective suppression of the occurrence of the cavitation phenomenon.

A plurality of the second residual pressure release ports 72 is provided in the radial direction. The rotation of the cylinder block 5 causes the cylinder port 20 to be simultaneously connected to the plurality of second residual pressure release ports 72. Simultaneous connection of the cylinder port 20 to the plurality of second residual pressure release ports 72 makes it possible to sufficiently reduce the pressure of the hydraulic oil in the cylinder bore 12. After the pressure of the hydraulic oil in the cylinder bore 12 is sufficiently reduced, the cylinder bore 12 is connected to the low pressure port 40. This can suppress a sudden decrease in the pressure of the hydraulic oil when the cylinder port 20 faces the low pressure port 40. This leads to effective suppression of the occurrence of the cavitation phenomenon.

The rear side portion 42 which is a rear side edge of the low pressure port 40 in the rotational direction includes the first portion 421 and the second portion 422 protruding to the rear side of the first portion 421 in the rotational direction. In the radial direction, the position of at least a part of the first portion 421 matches the position of the first residual pressure release port 71, while the position of at least a part of the second portion 422 matches the position of the second residual pressure release port 72. That is, in the radial direction, the distance between the rotation axis AX and at least a part of the first portion 421 matches the distance between the rotation axis AX and the first residual pressure release port 71. The distance between the rotation axis AX and at least a part of the second portion 422 matches the distance between the rotation axis AX and the second residual pressure release port 72. This allows the hydraulic oil to be discharged from the second residual pressure release port 72 immediately before the cylinder port 20 is connected to the low pressure port 40. This makes it possible to appropriately reduce the pressure of the hydraulic oil in the cylinder bore 12 while sufficiently ensuring the assist region 501.

The shape of the front side portion 21 which is the front side edge of the cylinder port 20 in the rotational direction matches the shape of the rear side portion 42 which is the rear side edge of the low pressure port 40 in the rotational direction. With this configuration, when the cylinder port 20 and the low pressure port 40 are connected by the rotation of the cylinder block 5, the front side portion 21 and the rear side portion 42 overlap each other. This suppresses the decrease in suction performance in the suction process. That is, even when the assist region 501 is large, a decrease in suction performance of the hydraulic pump 1 is suppressed.

[Other Embodiments]

In the above-described embodiment, the front side portion 21 which is the front side edge of the cylinder port 20 in the rotational direction has an arc shape protruding toward the front side in the rotational direction, and the rear side portion 42 which is the rear side edge of the low pressure port 40 in the rotational direction has an arc shape protruding toward the front side in the rotational direction. The rear side portion 42 which is the rear side edge of the low pressure port 40 in the rotational direction may have an arc shape protruding toward the rear side in the rotational direction.

In the above-described embodiment, the shape of the front side portion 21 which is the front side edge of the cylinder port 20 in the rotational direction matches the shape of the rear side portion 42 which is the rear side edge of the low pressure port 40 in the rotational direction. The shape of the front side portion 21 and the shape of the rear side portion 42 do not have to match.

In the above-described embodiment, the rear side portion 42 which is a rear side edge of the low pressure port 40 in the rotational direction includes the first portion 421 and the second portion 422 protruding to the rear side of the first portion 421 in the rotational direction. In addition, the second portion 422 is disposed at each position of the inner side and outer side of the first portion 421 in the radial direction. The second portion 422 may be disposed only on the inner side of the first portion 421 in the radial direction, or may be disposed only on the outer side of the first portion 421 in the radial direction.

In the above-described embodiment, in the radial direction, the position of at least a part of the first portion 421 matches the position of the first residual pressure release port 71, while the position of at least a part of the second portion 422 matches the position of the second residual pressure release port 72. In the radial direction, the position of the first portion 421 and the position of the first residual pressure release port 71 do not have to match. In the radial direction, the position of the second portion 422 and the position of the second residual pressure release port 72 do not have to match.

In the above-described embodiment, the cylinder port 20 is simultaneously connected to the second residual pressure release port 72*i* and the second residual pressure release port 72*o* by the rotation of the cylinder block 5. The cylinder port 20 may be connected to the second residual pressure release port 72*o* after being connected to the second residual pressure release port 72*i* by the rotation of the cylinder block 5. The cylinder port 20 may be connected to the second residual pressure release port 72*i* after being connected to the second residual pressure release port 72*o* by the rotation of the cylinder block 5. That is, the cylinder port 20 may be sequentially connected to the plurality of second residual pressure release ports 72.

In the above-described embodiment, the cylinder port 20 is connected to the second residual pressure release port 72 after being connected to the first residual pressure release port 71, and connected to the low pressure port 40 after being connected to the second residual pressure release port 72 by the rotation of the cylinder block 5. The cylinder port 20 may be simultaneously connected to the first residual pressure release port 71 and the second residual pressure release port 72 by the rotation of the cylinder block 5.

In the above-described embodiment, the size of the first residual pressure release port 71 is smaller than the size of the second residual pressure release port 72. The size of the first residual pressure release port 71 may be equal to the size of the second residual pressure release port 72, or may be larger than the size of the second residual pressure release port 72.

In the above-described embodiment, in the circumferential direction, a distance between the top dead center position 51 and the first residual pressure release port 71 is shorter than a distance between the top dead center position 51 and the second residual pressure release port 72. That is, the first residual pressure release port 71 is disposed on the rear side of the second residual pressure release port 72 in the rotational direction. The first residual pressure release port 71 may be disposed on the front side of the second residual pressure release port 72 in the rotational direction.

In the above-described embodiment, the first residual pressure release port 71, the second residual pressure release port 72*i*, and the second residual pressure release port 72*o* are each disposed to satisfy the condition of Formula (3).

$$|R1-R2i|>|R1-R2o| \tag{3A}$$

$$|R1-R2i|<|R1-R2o| \tag{3B}$$

These conditions may be satisfied.

In the above-described embodiment, the second residual pressure release port 72 includes: the second residual pressure release port 72*i* disposed on the inner side of the first residual pressure release port 71 in the radial direction; and the second residual pressure release port 72*o* disposed on the outer side of the first residual pressure release port 71 in the radial direction. The second residual pressure release port 72*i* may be disposed and the second residual pressure release port 72*o* may be omitted. The second residual pressure release port 72*o* may be disposed and the second residual pressure release port 72*i* may be omitted.

In the above-described embodiment, the first residual pressure release port 71 is disposed at the center of the first region 50 in the radial direction. That is, the first residual pressure release port 71 is disposed so as to satisfy the condition of Formula (2). The first residual pressure release port 71 does not have to satisfy the condition of Formula (2). That is, the first residual pressure release port 71 may be disposed at a position shifted from the center of the first region 50 in the radial direction.

In the above-described embodiment, in the circumferential direction, a distance between the top dead center position 51 and the first residual pressure release port 71 is shorter than a distance between the top dead center position 51 and the second residual pressure release port 72. In the circumferential direction, the distance between the top dead center position 51 and the first residual pressure release port 71 may be equal to the distance between the top dead center position 51 and the second residual pressure release port 72. That is, the plurality of residual pressure release ports 70 may be disposed in the radial direction. The number of residual pressure release ports 70 disposed in the radial direction may be two or any plural number of three or more. For example, one first residual pressure release port 71 and one second residual pressure release port 72 may be disposed in the radial direction. In a case where the plurality of residual pressure release ports 70 is disposed in the radial direction, the sizes of the plurality of residual pressure release ports 70 may be the same or may be different.

The above-described embodiment is an example in which the components according to the present disclosure are applied to the hydraulic pump 1. The components according to the present disclosure may be applied to a hydraulic motor. In the case of application to a hydraulic motor, hydraulic oil is sucked from the discharge port 101, and hydraulic oil is discharged from the suction port 102.

REFERENCE SIGNS LIST

1 HYDRAULIC PUMP
2 CASE
2A CYLINDRICAL PORTION
2B BASE PORTION
3 END CAP
4 SHAFT
5 CYLINDER BLOCK
5A SLIDING SURFACE
6 PISTON
6A RECESS
7 SHOE

7A PROTRUSION
7B SLIDING PORTION
8 SWASH PLATE
8A RECESS
8B SLIDING SURFACE
9 VALVE PLATE
9A SLIDING SURFACE
10A BEARING
10B BEARING
11 SPLINE MECHANISM
12 CYLINDER BORE
13 SUPPORT MEMBER
14 RING
15 SPRING
16 MOVABLE RING
17 NEEDLE
18 PRESSING MEMBER
19 PISTON
20 CYLINDER PORT
21 FRONT SIDE PORTION
22 REAR SIDE PORTION
23 INNER SIDE PORTION
24 OUTER SIDE PORTION
25 FRONT APEX
26 REAR APEX
30 HIGH PRESSURE PORT
31 FRONT SIDE PORTION
32 REAR SIDE PORTION
33 INNER SIDE PORTION
34 OUTER SIDE PORTION
35 FRONT APEX
36 REAR APEX
37 NOTCH
40 LOW PRESSURE PORT
41 FRONT SIDE PORTION
42 REAR SIDE PORTION
43 INNER SIDE PORTION
44 OUTER SIDE PORTION
45 FRONT APEX
46 REAR BOTTOM
47 REAR APEX
421 FIRST PORTION
422 SECOND PORTION
50 FIRST REGION
51 TOP DEAD CENTER POSITION
53 INNER SIDE PORTION
54 OUTER SIDE PORTION
60 SECOND REGION
61 BOTTOM DEAD CENTER POSITION
63 INNER SIDE PORTION
64 OUTER SIDE PORTION
70 RESIDUAL PRESSURE RELEASE PORT
71 FIRST RESIDUAL PRESSURE RELEASE PORT
72 SECOND RESIDUAL PRESSURE RELEASE PORT
72*i* SECOND RESIDUAL PRESSURE RELEASE PORT
72*o* SECOND RESIDUAL PRESSURE RELEASE PORT
101 DISCHARGE PORT
102 SUCTION PORT
501 ASSIST REGION
502 RESIDUAL PRESSURE RELEASE REGION
AX ROTATION AXIS
AR ARROW
VC VIRTUAL CIRCLE

The invention claimed is:

1. A hydraulic pump/motor comprising:
a cylinder block that rotates about a rotation axis;
a piston disposed in a cylinder bore of the cylinder block; and
a valve plate facing a cylinder port of the cylinder bore, wherein the valve plate includes:
a high pressure port through which hydraulic oil discharged from the cylinder port flows;
a low pressure port through which hydraulic oil to be sucked into the cylinder port flows;
a first region disposed between the high pressure port and the low pressure port in a circumferential direction of the rotation axis, the first region including a top dead center position facing the cylinder port of the cylinder bore in which the piston having moved to a top dead center is disposed; and
a residual pressure release port provided between the top dead center position and the low pressure port in the first region, and
the residual pressure release port includes a first residual pressure release port and a second residual pressure release port, the second residual pressure release port being disposed at a position different from the first residual pressure release port in a radial direction of the rotation axis,
wherein, in the radial direction, when a distance between the rotation axis and a center of the low pressure port is Rb, a distance between the rotation axis and a center of the first residual pressure release port is R1, and a distance between the rotation axis and a center of the second residual pressure release port is R2, a condition $|Rb-R1|<|Rb-R2|$ is satisfied.

2. The hydraulic pump/motor according to claim 1, wherein a condition Rb=R1 is satisfied.

3. The hydraulic pump/motor according to claim 1, wherein the second residual pressure release port is disposed at each position of an inner side and an outer side of the first residual pressure release port in the radial direction.

4. The hydraulic pump/motor according to claim 3, wherein, in the radial direction, when a distance between the rotation axis and a center of the second residual pressure release port on the inner side in the radial direction is R2*i*, and a distance between the rotation axis and a center of the second residual pressure release port on the outer side in the radial direction is R2*o*, a condition $|R1-R2i|=|R1-R2o|$ is satisfied.

5. The hydraulic pump/motor according to claim 1, wherein, in the circumferential direction, a distance between the top dead center position and the first residual pressure release port is shorter than a distance between the top dead center position and the second residual pressure release port.

6. The hydraulic pump/motor according to claim 5, wherein a rear side edge of the low pressure port in a rotational direction includes a first portion and a second portion, the second portion protruding to the rear side of the first portion in the rotational direction, and
in the radial direction, a distance between the rotation axis and at least a part of the first portion matches a distance between the rotation axis and the first residual pressure release port, and a distance between the rotation axis and at least a part of the second portion matches a distance between the rotation axis and the second residual pressure release port.

7. The hydraulic pump/motor according to claim 1,
wherein a shape of a front side edge of the cylinder port in the rotational direction matches a shape of a rear side edge of the low pressure port in the rotational direction.

8. The hydraulic pump/motor according to claim 7,
wherein the front side edge of the cylinder port in the rotational direction has an arc shape protruding toward the front side in the rotational direction, and
the rear side edge of the low pressure port in the rotational direction has an arc shape protruding toward the front side in the rotational direction.

9. The hydraulic pump/motor according to claim 1,
wherein the valve plate includes
a second region that is disposed between the low pressure port and the high pressure port in the circumferential direction of the rotation axis, the second region including a bottom dead center position facing the cylinder port of the cylinder bore in which the piston moved to a bottom dead center is disposed.

10. A hydraulic pump/motor comprising:
a cylinder block that rotates about a rotation axis;
a piston disposed in a cylinder bore of the cylinder block; and
a valve plate facing a cylinder port of the cylinder bore,
wherein the valve plate includes:
a high pressure port through which hydraulic oil discharged from the cylinder port flows;
a low pressure port through which hydraulic oil to be sucked into the cylinder port flows;
a first region disposed between the high pressure port and the low pressure port in a circumferential direction of the rotation axis, the first region including a top dead center position facing the cylinder port of the cylinder bore in which the piston having moved to a top dead center is disposed; and
a residual pressure release port provided between the top dead center position and the low pressure port in the first region, and
the residual pressure release port includes a first residual pressure release port and a second residual pressure release port, the second residual pressure release port being disposed at a position different from the first residual pressure release port in a radial direction of the rotation axis,
wherein, in the circumferential direction, a distance between the top dead center position and the first residual pressure release port is shorter than a distance between the top dead center position and the second residual pressure release port, and
wherein a size of the first residual pressure release port is smaller than a size of the second residual pressure release port.

11. The hydraulic pump/motor according to claim 10,
wherein the first region includes:
an assist region that is disposed between the top dead center position and the second residual pressure release port, and in which a rotation assist force of the cylinder block is generated based on hydraulic oil in the cylinder bore; and
a residual pressure release region that is disposed between the assist region and the low pressure port, and in which a pressure of hydraulic oil in the cylinder bore decreases by connection between the second residual pressure release port and the cylinder bore,
the first residual pressure release port is provided in the assist region, and
the second residual pressure release port is provided in the residual pressure release region.

12. A hydraulic pump/motor comprising:
a cylinder block that rotates about a rotation axis;
a piston disposed in a cylinder bore of the cylinder block; and
a valve plate facing a cylinder port of the cylinder bore,
wherein the valve plate includes:
a high pressure port through which hydraulic oil discharged from the cylinder port flows;
a low pressure port through which hydraulic oil to be sucked into the cylinder port flows;
a first region disposed between the high pressure port and the low pressure port in a circumferential direction of the rotation axis, the first region including a top dead center position facing the cylinder port of the cylinder bore in which the piston having moved to a top dead center is disposed; and
a residual pressure release port provided between the top dead center position and the low pressure port in the first region, and
the residual pressure release port includes a first residual pressure release port and a second residual pressure release port, the second residual pressure release port being disposed at a position different from the first residual pressure release port in a radial direction of the rotation axis,
wherein, in the circumferential direction, a distance between the top dead center position and the first residual pressure release port is shorter than a distance between the top dead center position and the second residual pressure release port, and
wherein the cylinder block rotates such that the cylinder bore is to be connected to the second residual pressure release port after being connected to the first residual pressure release port, and is to be connected to the low pressure port after being connected to the second residual pressure release port.

13. The hydraulic pump/motor according to claim 12,
wherein a plurality of the second residual pressure release ports is provided in the radial direction, and
the cylinder port is simultaneously connected to the plurality of second residual pressure release ports.

14. The hydraulic pump/motor according to claim 12,
wherein a plurality of the second residual pressure release ports is provided in the radial direction, and
the cylinder port is sequentially connected to the plurality of second residual pressure release ports.

* * * * *